Patented July 25, 1933

1,919,592

UNITED STATES PATENT OFFICE

FELIX KLINGEMANN, OF FRANKFORT-ON-THE-MAIN-MAINKUR, WILHELM LOMMEL, OF WIESDORF, NEAR COLOGNE-ON-THE-RHINE, ERNST KORTEN, OF FRANKFORT-ON-THE-MAIN-FECHENHEIM, AND THEODOR GOOST, OF LEVERKUSEN, NEAR COLOGNE-ON-THE-RHINE, GERMANY, ASSIGNORS TO I. G. FARBENINDUSTRIE AKTIENGE-SELLSCHAFT, A CORPORATION OF GERMANY

PROCESS FOR MANUFACTURING AR-TETRAHYDRONAPHTHYLAMINE COMPOUNDS

No Drawing. Original application filed October 2, 1926, Serial No. 139,226, and in Germany October 10, 1925. Divided and this application filed December 26, 1928. Serial No. 328,620.

This application is a division of our application Serial No. 139,226, filed October 2, 1926, now Patent No. 1,782,729.

The methods hitherto known for preparing hydrogenated aromatic amino compounds do not give satisfactory results. The hydrogenation of primary aromatic amines as described by Ipatiew (cf. Berichteder deutschen Chem. Gesellschaft 41/1908/page 991) with hydrogen and catalysts under pressure goes on very slowly and undesirable by-products are formed. Sabatier and Senderens have reduced secondary and tertiary amines in the present of finely divided nickel in the gaseous state, but their results are far from being satisfactory as far as quantity and quality is concerned. (Compt. rend. de l'acad. de science, vol. 138, page 457).

Now we have found that aromatic amino compounds of the general formula:

(in which formula R means an arylresidue of the benzene- or of the naphthalene series, $X_1$ means hydrogen, which may be replaced by alkyl, aralkyl and aryl, and $X_2$ means alkyl, which may be replaced by aralkyl or acyl) add hydrogen quickly and smoothly when treated in a liquid phase with hydrogen in the presence of a hydrogenation catalyst under pressure. Nickel, cobalt, copper or mixtures of these metals or oxides thereof, advantageously precipitated on a substratum of large surface, herein-after referred to simply by the term "base metal hydrogenation catalysts" may be used as the hydrogenation catalysts. In case of the alkyl-, aralkyl- or aryl derivatives the desired hydrogenated bases are obtained immediately, while in the case of acyl derivatives the acylgroup may be removed by saponification, the free hydrogenated bases being thus formed.

The products obtained by the method described above are partially new and may be used for the preparation of pharmaceutical and other valuable technical products.

In order to further illustrate our invention the following examples are given, the parts being by weight and all temperatures in centigrade degrees, but it is understood, that our invention is not limited to the particular products or reacting conditions mentioned therein.

Example 1

50 parts of acetyl-α-naphthylamine are heated with 150 parts of tetrahydronaphthalene and 1 part of a kieselguhr catalyst containing about 25% nickel in an autoclave while stirring under a hydrogen pressure of about 15–30 atmospheres. The addition of hydrogen begins at a temperature of a little above 110° C., but it is advisable to raise the temperature to 160–180° C. When two molecules of hydrogen have been added, the mass while still hot is filtered off from the catalyst. From the filtrate acetyl-ar-tetrahydro-α-naphthylamine of the formula:

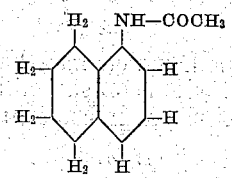

separates out in an already pure state in form of fine needles of the melting point 159° C. The yield is nearly quantitative.

By saponification of the acetyl product according to the usual methods the free ar-tetrahydro-α-naphthylamine is obtained in form of an oil, which does not solidify at ordinary temperatures and which boils at 275° C. under normal pressure.

Example 2

50 parts of pure acetyl-β-naphthylamine are heated in an autoclave while stirring with 200 parts of dekahydronaphthalene in the presence of a catalyst containing nickel under a hydrogen pressure of about 20 atmospheres. When 2 molecules of hydrogen have been added the mass is filtered. The dekahydronaphthalene is distilled off with steam. From the residue the acetyl-ar-tetrahydro-β-naphthylamine of the formula

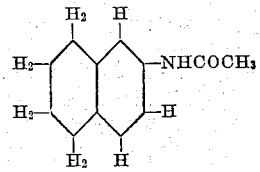

can be extracted with ether. After the ether is distilled off the product remains in form of an oil which solidifies on cooling. The acetyl compound may be saponified by treatment with hydrochloric acid. The ar-tetrahydro-β-naphthylamine thus obtained has the boiling point 271–273° C. at normal pressure (Bamberger, Ber. der deutsch. chem. Gesellschaft 23, page 882, gives the boiling point as 275–277° C.).

*Example 3*

35 parts of benzoyl-β-naphthylamine, 70 parts of dekahydronaphthalene and 1.7 parts of a kieselguhr catalyst containing 15% nickel are heated in an autoclave while stirring under a hydrogen pressure of 15–30 atmospheres to about 170° C. Two molecules of hydrogen are absorbed very quickly under these conditions. When this point is reached, the operation is interrupted. The benzoyl-ar-tetrahydro-β-naphthylamine of the formula

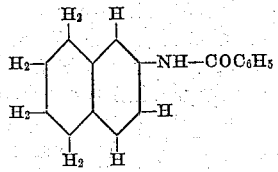

thus obtained, which has the melting point 165–167° C. yields on saponification the base already described in Example 2.

*Example 4*

If instead of the acetyl compound used in Example 1 formyl-α-naphthylamine is reduced under similar conditions, the product obtained yields after saponification the same ar-tetrahydro-α-naphthylamine described in Example 1.

In the same way tetrahydro-β-naphthylamine may be obtained from formyl-β-naphthylamine.

Also phthalic-α-naphthalide can be readily reduced according to the same process. The reduction product yields after saponification the same ar-tetrahydro-α-naphthylamine as described in Example 1.

*Example 5*

20 parts of 2-acetyl amino-naphthalene-3-carboxylic ethylester, melting at 123° C. are hydrogenated under a hydrogen pressure of 15–30 atmospheres while stirring in the presence of 100 parts of dekahydronaphthalene and 0.4 parts of a kieselguhr catalyst containing about 15% nickel. Two molecules of hydrogen are quickly absorbed at a temperature of 120° C. By saponifying the hydrogenated ester under the usual conditions, the free 2-amino-3-ar-tetrahydronaphthoic acid of the probable formula:

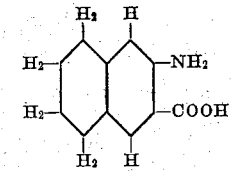

is obtained. This new compound is readily soluble both in alkalies and in acids. It can be recrystallized from organic solvents of a low boiling point. From acetic acid it separates for instance in colorless fine needles, melting at 180–182° C.

Also other bases as for instance acetyl-phenyl-α-naphthylamine absorb hydrogen under corresponding conditions at about 130–180° C. rapidly and yield after saponification bases, which are hydrogenated in the nucleus which is not substituted by the amino group.

We claim:

1. A process which comprises treating amino compounds of the naphthalene series of the general formula:

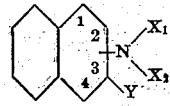

wherein Y stands for hydrogen or COO-alkyl, in case Y is COO alkyl, the group

stands in 2-position, and $X_1$ stands for hydrogen or an alkyl-, aralkyl-, aryl- or acyl-group, $X_2$ for an acyl-group, in a liquid phase with hydrogen under superatmospheric pressure in the presence of a base metal hydrogenation catalyst and saponifying the ar-tetra-hydroacylamino compounds thus obtained.

2. A process which comprises treating amino compounds of the naphthalene series of the general formula:

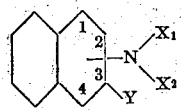

wherein Y stands for hydrogen or COO-alkyl, in case Y is COO alkyl, the group

stands in 2-position and $X_1$ stands for hydrogen or an acyl-group and $X_2$ for an acyl-group, in a liquid phase with hydrogen under superatmospheric pressure in the presence of a base metal hydrogenation catalyst and saponifying the ar-tetrahydroacylamino compounds thus obtained.

3. A process which comprises treating an 2-acylaminonaphthalene-3-carboxylic ester of the general formula:

in a liquid phase with hydrogen under superatmospheric pressure in the presence of a base metal hydrogenation catalyst and saponifying the ar-tetrahydroacylamino compounds thus obtained.

4. As a new compound the 2-amino-3-ar-tetrahydronaphthoic acid of the probable formula:

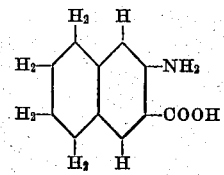

crystallizing from organic solvents in colorless fine needles melting at 180–182° C.

FELIX KLINGEMANN.
ERNST KORTEN.
WILHELM LOMMEL.
THEODOR GOOST.